US010450682B2

(12) United States Patent
Imaizumi

(10) Patent No.: US 10,450,682 B2
(45) Date of Patent: Oct. 22, 2019

(54) SEWING MACHINE AND NON-TRANSITORY COMPUTER-READABLE MEDIUM

(71) Applicant: BROTHER KOGYO KABUSHIKI KAISHA, Nagoya-shi, Aichi-ken (JP)

(72) Inventor: Kazutaka Imaizumi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 117 days.

(21) Appl. No.: 15/803,606

(22) Filed: Nov. 3, 2017

(65) Prior Publication Data

US 2018/0057985 A1     Mar. 1, 2018

Related U.S. Application Data

(63) Continuation of application No. PCT/JP2016/072303, filed on Jul. 29, 2016.

(30) Foreign Application Priority Data

Sep. 30, 2015   (JP) ................. 2015-194557

(51) Int. Cl.
*D05B 19/10*   (2006.01)
*D05B 19/02*   (2006.01)
(Continued)

(52) U.S. Cl.
CPC ............ *D05B 19/10* (2013.01); *D05B 19/02* (2013.01); *D05B 29/00* (2013.01); *D05B 55/00* (2013.01); *D05C 5/02* (2013.01); *G06T 1/0007* (2013.01)

(58) Field of Classification Search
CPC ........ D05B 19/00; D05B 19/02; D05B 19/08; D05B 19/10; D05B 19/12; D05B 19/16; D05C 5/02

(Continued)

(56) References Cited

U.S. PATENT DOCUMENTS 4,998,489 A * 3/1991 Hisatake ............ D05B 19/08
112/103
5,911,182 A * 6/1999 Uyama ............. D05B 19/085
112/102.5

(Continued)

FOREIGN PATENT DOCUMENTS

JP   H09-176955 A   7/1997
JP   2002-273078 A   9/2002

(Continued)

OTHER PUBLICATIONS

Oct. 4, 2016 International Search Report issued in International Patent Application No. PCT/JP2016/072303.

*Primary Examiner* — Nathan E Durham
(74) *Attorney, Agent, or Firm* — Oliff PLC

(57) ABSTRACT

A sewing machine includes an image capture portion, a conveyance portion, a processor and a memory. The conveyance portion is configured to convey an object to be captured relative to the image capture portion. The memory is configured to store computer-readable instructions that, when executed by the processor, instruct the processor to perform processes. The processes include identifying a target range that is wider than an image capture range and calculating a minimum number of times of conveyance in a first direction. The processes include setting a specified range and the relative position corresponding to the specified range, on the basis of color information of reference image data representing a reference image. The processes include controlling the image capture portion and the conveyance portion and synthesizing the plurality of generated partial image data to generate composite image data representing the whole of the target range.

10 Claims, 9 Drawing Sheets

(51) Int. Cl.
*D05B 29/00* (2006.01)
*D05B 55/00* (2006.01)
*D05C 5/02* (2006.01)
*G06T 1/00* (2006.01)

(58) Field of Classification Search
USPC .............................. 700/136–138; 112/102.5
See application file for complete search history.

(56) References Cited

U.S. PATENT DOCUMENTS

| | | |
|---|---|---|
| 2002/0129626 A1 | 9/2002 | Kawamura et al. |
| 2007/0005175 A1* | 1/2007 | Konig ................... D05B 19/00 700/138 |
| 2007/0221107 A1* | 9/2007 | Kato ...................... D05B 19/12 112/103 |
| 2009/0217850 A1 | 9/2009 | Tokura |
| 2011/0048299 A1* | 3/2011 | Tokura ................... D05B 19/12 112/102.5 |
| 2011/0048301 A1* | 3/2011 | Tokura ................... D05B 19/12 112/103 |
| 2011/0202165 A1* | 8/2011 | Tokura ................... D05B 19/16 700/138 |
| 2011/0226171 A1* | 9/2011 | Tokura ................... D05B 19/10 112/470.05 |
| 2012/0191237 A1 | 7/2012 | Tokura |
| 2014/0230706 A1* | 8/2014 | Suzuki ................... D05B 19/12 112/102.5 |
| 2014/0230707 A1* | 8/2014 | Suzuki ................... D05B 19/12 112/102.5 |
| 2015/0259839 A1* | 9/2015 | Iida ........................ D05B 81/00 112/470.05 |
| 2016/0032508 A1* | 2/2016 | Tokura ................... D05B 19/08 112/102.5 |

FOREIGN PATENT DOCUMENTS

| | | |
|---|---|---|
| JP | 2009-201704 A | 9/2009 |
| JP | 2010-004904 A | 1/2010 |
| JP | 2012-147985 A | 8/2012 |

* cited by examiner

SEWING MACHINE AND NON-TRANSITORY COMPUTER-READABLE MEDIUM

CROSS-REFERENCE TO RELATED APPLICATION

This application is a continuation application of International Application No. PCT/JP2016/072303, filed Jul. 29, 2016, which claims priority from Japanese Patent Application No. 2015-194557, filed on Sep. 30, 2015. The disclosure of the foregoing application is hereby incorporated by reference in its entirety.

BACKGROUND

The present disclosure relates to a sewing machine provided with an image capture portion, and to a non-transitory computer-readable medium.

A sewing machine provided with an image capture portion is known. In the known sewing machine, the image capture portion captures images (partial images) obtained by dividing an object to be captured into a plurality of areas. The image capture portion generates a plurality of image data representing the captured partial images. The sewing machine synthesizes the captured partial images on the basis of the plurality of generated image data, and thus generates a composite image showing a whole area of the object to be captured.

SUMMARY

There is a case in which hues of partial images represented by image data generated by an image capture portion are different from each other due to factors (such as ambient brightness, a light source difference and the like) of an environment in which a sewing machine is used. In this case, when the sewing machine generates a composite image by synthesizing the partial images, there is a possibility that a difference in shades of color may occur at joints between the partial images in the composite image.

Various embodiments of the broad principles derived herein provide a sewing machine and a non-transitory computer-readable medium that are capable of acquiring a composite image while suppressing a difference in shades of color from occurring at joints between partial images.

Embodiments herein provide a sewing machine that includes an image capture portion, a conveyance portion, a processor and a memory. The image capture portion has a predetermined image capture range. The conveyance portion is configured to convey an object to be captured relative to the image capture portion. The memory is configured to store computer-readable instructions that, when executed by the processor, instruct the processor to perform processes. The processes include identifying a target range. The target range is a range wider than the image capture range, and is a range capable of being captured by the image capture portion as a result of the object to be captured is conveyed by the conveyance portion. The processes include calculating a minimum number of times of conveyance in a first direction, when image capture of the whole of the target range is performed such that, while the conveyance portion is conveying the object to be captured in the first direction relative to the image capture portion, image capture of a part of the target range by the image capture portion is repeated by changing a relative position of the object to be captured with respect to the image capture portion in a second direction orthogonal to the first direction. The processes include setting a specified range and the relative position corresponding to the specified range, on the basis of color information of reference image data representing a reference image. The reference image is formed by a plurality of pixels and the reference image is generated by the image capture portion capturing an image of a color reference member, the specified range being a range within the image capture range and being set such that the image capture of the whole of the target range is possible with the calculated minimum number of times of conveyance. The processes include controlling the image capture portion and the conveyance portion so as to cause the image capture portion to capture an image of the object to be captured while conveying the object to be captured in the first direction relative to the image capture portion at the set relative position, and performing processing, the minimum number of times of conveyance, that generates a plurality of image data representing partial images captured in the specified range of the image capture portion. The processes include synthesizing the plurality of generated partial image data to generate composite image data representing the whole of the target range.

Embodiments further provide a non-transitory computer-readable medium that stores computer-readable instructions that, when executed, instruct a processor of a sewing machine to perform processes. The sewing machine includes an image capture portion, a conveyance portion, a processor and a memory. The image capture portion has a predetermined image capture range. The conveyance portion is configured to convey an object to be captured relative to the image capture portion. The processes include identifying a target range. The target range is a range wider than the image capture range, and is a range capable of being captured by the image capture portion as a result of the object to be captured is conveyed by the conveyance portion. The processes include calculating a minimum number of times of conveyance in a first direction, when image capture of the whole of the target range is performed such that, while the conveyance portion is conveying the object to be captured in the first direction relative to the image capture portion, image capture of a part of the target range by the image capture portion is repeated by changing a relative position of the object to be captured with respect to the image capture portion in a second direction orthogonal to the first direction. The processes include setting a specified range and the relative position corresponding to the specified range, on the basis of color information of reference image data representing a reference image. The reference image is formed by a plurality of pixels and the reference image is generated by the image capture portion capturing an image of a color reference member, the specified range being a range within the image capture range and being set such that the image capture of the whole of the target range is possible with the calculated minimum number of times of conveyance. The processes include controlling the image capture portion and the conveyance portion so as to cause the image capture portion to capture an image of the object to be captured while conveying the object to be captured in the first direction relative to the image capture portion at the set relative position, and performing processing, the minimum number of times of conveyance, that generates a plurality of image data representing partial images captured in the specified range of the image capture portion. The processes include synthesizing the plurality of generated partial image data to generate composite image data representing the whole of the target range.

BRIEF DESCRIPTION OF THE DRAWINGS

Embodiments will be described below in detail with reference to the accompanying drawings in which.

DETAILED DESCRIPTION

Hereinafter, an embodiment of the present disclosure will be explained with reference to the drawings. A physical configuration of a sewing machine 1 will be explained with reference to FIG. 1 and FIG. 2. The up-down direction, the lower right, the upper left, the lower left, and the upper right of FIG. 1 respectively correspond to the up-down direction, the front, the rear, the left, and the right of the sewing machine 1. In other words, a surface on which a liquid crystal display (LCD) 7 is disposed is a front surface of the sewing machine 1. A longer direction of a bed 11 and an arm 13 is the left-right direction of the sewing machine 1. A side on which a pillar 12 is disposed is the right side of the sewing machine 1. A direction in which the pillar 12 extends is the up-down direction of the sewing machine 1.

Figure 1:
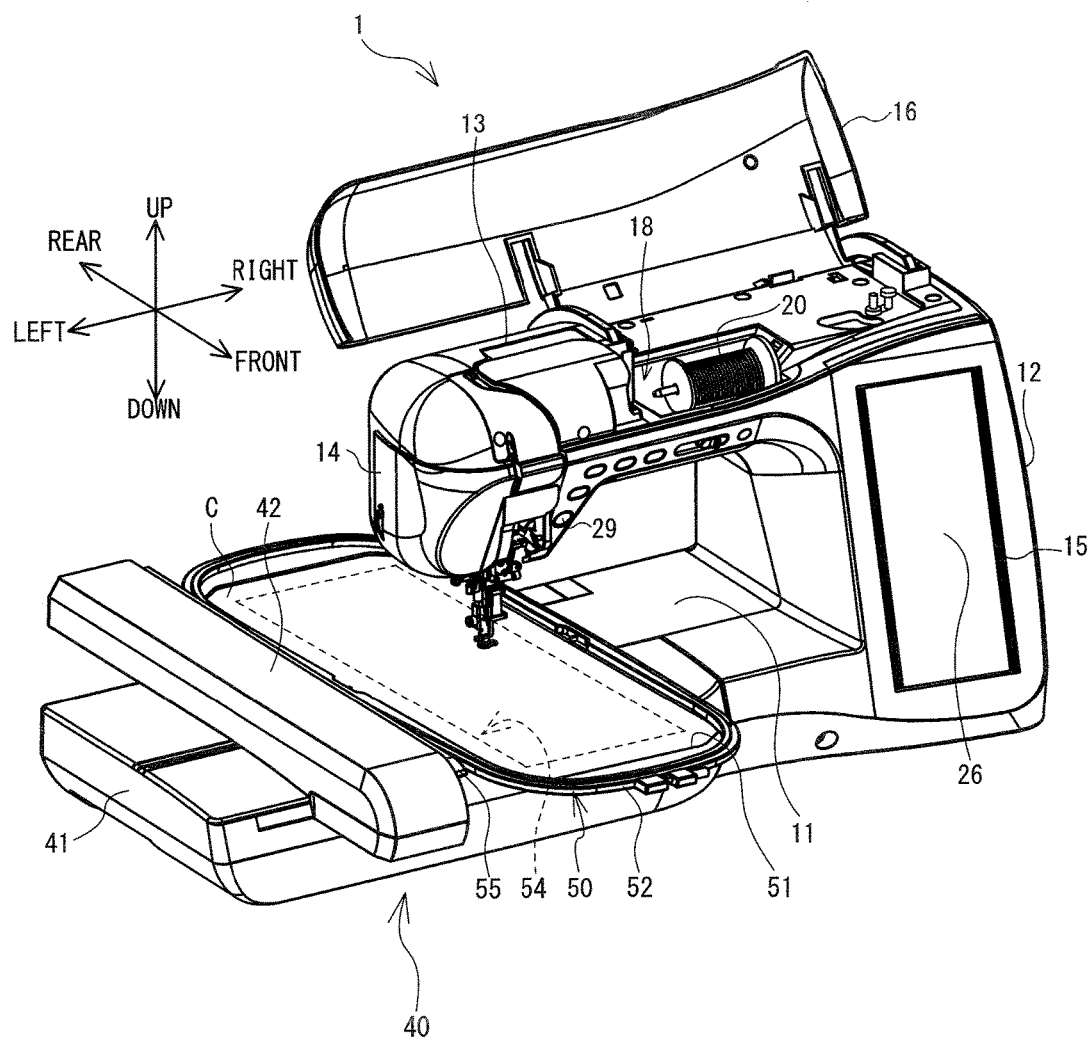
FIG. 1 is a perspective view of a sewing machine.

As shown in FIG. 1, the sewing machine 1 includes the bed 11, the pillar 12, the arm 13, and a head 14. The bed 11 is a base portion of the sewing machine 1 and extends in the left-right direction. The pillar 12 extends upward from the right end portion of the bed 11. The arm 13 extends to the left from the upper end portion of the pillar 12 such that the arm 13 is opposed to the bed 11. The head 14 is a portion that is connected to the left leading end portion of the arm 13.

A needle plate 21 (refer to FIG. 2) is provided on the top surface of the bed 11. The needle plate 21 has a needle hole 22 (refer to FIG. 6) through which a sewing needle 7, to be described later, can be inserted. A sewing workpiece (such as a work cloth), which is not shown in the drawings, is placed on the top surface of the needle plate 21. The sewing machine 1 includes a feed dog, a feed mechanism, a shuttle mechanism, and the like, which are not shown in the drawings, underneath the needle plate 21 (namely, inside the bed 11). In a case where normal sewing, which is not embroidery sewing, is performed, the feed dog may be driven by the feed mechanism to feed a sewing workpiece, such as a work cloth, by a specified feed amount. The shuttle mechanism may cause an upper thread (not shown in the drawings) to be entwined with a lower thread (not shown in the drawings), underneath the needle plate 21.

The sewing machine 1 further includes a movement mechanism 40. The movement mechanism 40 is configured to be capable of conveying a sewing workpiece C (an object to be captured) held by an embroidery frame 50 relative to an image sensor 35 and a needle bar 6, which are to be described later. The movement mechanism 40 includes a main body portion 41 and a carriage 42. The carriage 42 includes a frame holder (not shown in the drawings), a Y axis movement mechanism (not shown in the drawings), and a Y axis motor 84 (refer to FIG. 3). The frame holder is provided on the right side surface of the carriage 42. A selected one of a plurality of types of the embroidery frame 50, whose sizes and shapes are different from each other, can be mounted on and removed from the frame holder. The Y axis movement mechanism may move the frame holder in the front-rear direction (a Y axis direction). The Y axis motor 84 may drive the Y axis movement mechanism.

The embroidery frame 50 of the present embodiment has a first frame member 51, a second frame member 52 and an attachment portion 55. The sewing workpiece C can be held by the first frame member 51 and the second frame member 52. A sewing area 54, which is set inside the embroidery frame 50, is an area in which the sewing machine 1 can form stitches. The attachment portion 55 is a portion that is mounted on the frame holder. The attachment portion 55 has a shape specific to the embroidery frame 50. When the embroidery frame 50 is mounted on the frame holder of the movement mechanism 40, the sewing machine 1 is configured to determine that the embroidery frame 50 has been mounted and to identify the type of the embroidery frame 50, on the basis of the shape of the attachment portion 55 detected by a detector 36 (refer to FIG. 3) to be described later.

Figure 3:
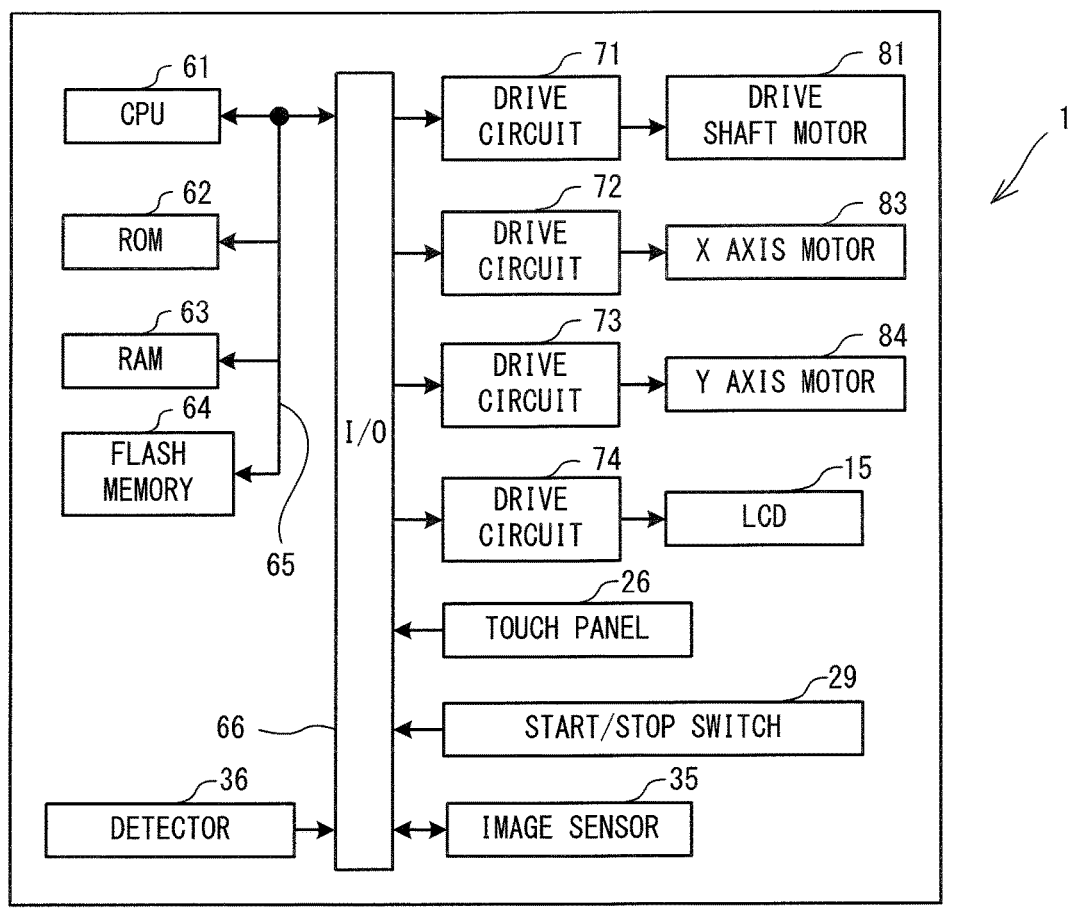
FIG. 3 is a block diagram showing an electrical configuration of the sewing machine.

The main body portion 41 internally includes an X axis movement mechanism (not shown in the drawings) and an X axis motor 83 (refer to FIG. 3). The X axis movement mechanism may move the carriage 42 in the left-right direction (an X axis direction). By the carriage 42 being moved in the left-right direction, the embroidery frame 50 may move the sewing workpiece 3 in the left-right direction. The X axis motor 83 may drive the X axis movement mechanism. The movement mechanism 40 may move the embroidery frame 50 mounted on the carriage 42 to a position indicated by a unique XY coordinate system (an embroidery coordinate system). The right direction, the left direction, the front direction, and the rear direction of the sewing machine 1 respectively correspond to an X plus direction, an X minus direction, a Y plus direction, and a Y minus direction of the embroidery coordinate system.

The LCD 15 is provided on the front surface of the pillar 12. An image including various items, such as a command, an illustration, a setting value, a message, etc., may be displayed on the LCD 15. A touch panel 26, which can detect a pressed position, is provided on the front surface side of the LCD 15. When the user performs a pressing operation on the touch panel 26 using the user's finger or a stylus pen (not shown in the drawings), the pressed position may be detected by the touch panel 26. A CPU 61 (refer to FIG. 3) of the sewing machine 1 may recognize an item selected on the image, based on the detected pressed position. Hereinafter, the pressing operation on the touch panel 26 by the user is referred to as a panel operation. By a panel operation, the user may select an embroidery pattern that the user desires to sew or may select a command to be executed etc. A drive shaft motor 81 (refer to FIG. 3) is provided inside the pillar 12.

A cover 16 is provided on an upper portion of the arm 13 such that the cover 16 may open and close. In FIG. 1, the cover 16 is in an open state. A thread storage portion 18 is provided below the cover 16, that is, inside the arm 13. The thread storage portion 18 may house a thread spool 20 on which the upper thread is wound. The drive shaft (not shown in the drawings), which extends in the left-right direction, is provided inside the arm 13. The drive shaft may be rotationally driven by the drive shaft motor 81. Various switches, including a start/stop switch 29, are provided on the lower left portion of the front surface of the arm 13. The start/stop switch 29 is used to input an instruction to start or stop the operation of the sewing machine 1, namely, to start or stop sewing.

Figure 2:
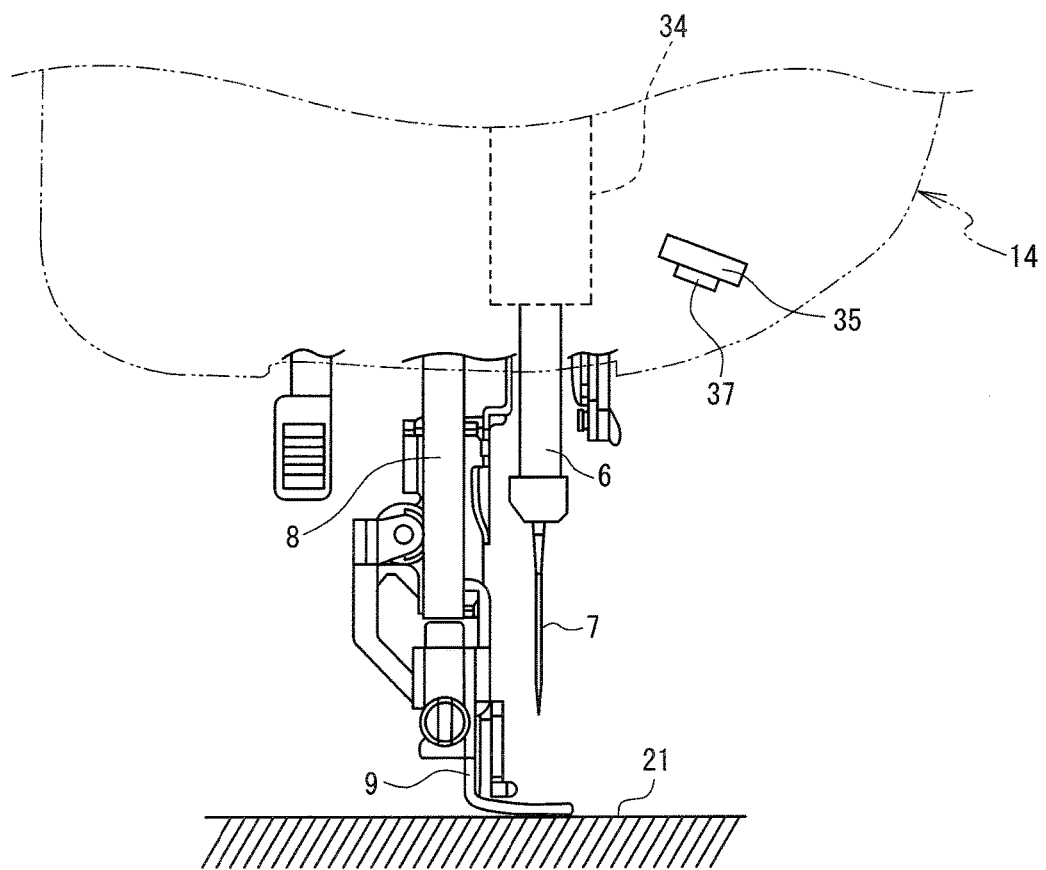
FIG. 2 is an explanatory diagram showing a configuration of a lower end portion of a head.

As shown in FIG. 2, the needle bar 6, a presser bar 8, a needle bar up-and-down movement mechanism 34, etc. are provided on the head 14. A sewing needle 7 may be removably attached to the lower end of the needle bar 6. The presser foot 9 may be removably attached to the lower end portion of the presser bar 8. The needle bar 6 is provided on the lower end of the needle bar up-and-down movement mechanism 34. The needle bar up-and-down movement mechanism 34 may drive the needle bar 6 in the up-down direction as a result of the rotation of the drive shaft.

The image sensor 35 having a predetermined image capture range is provided inside the head 14. The image sensor 35 is, for example, a known complementary metal oxide semiconductor (CMOS) image sensor. The image sensor 35 is a known area sensor in which image pickup elements 37 (for example, a plurality of the CMOS) aligned in a main scanning direction are arranged in a plurality of rows in a sub-scanning direction. In the present embodiment, the main scanning direction and the sub-scanning direction correspond respectively to the X axis direction (the left-right direction) and the Y axis direction (the front-rear direction) of the sewing machine 1.

Figure 6:
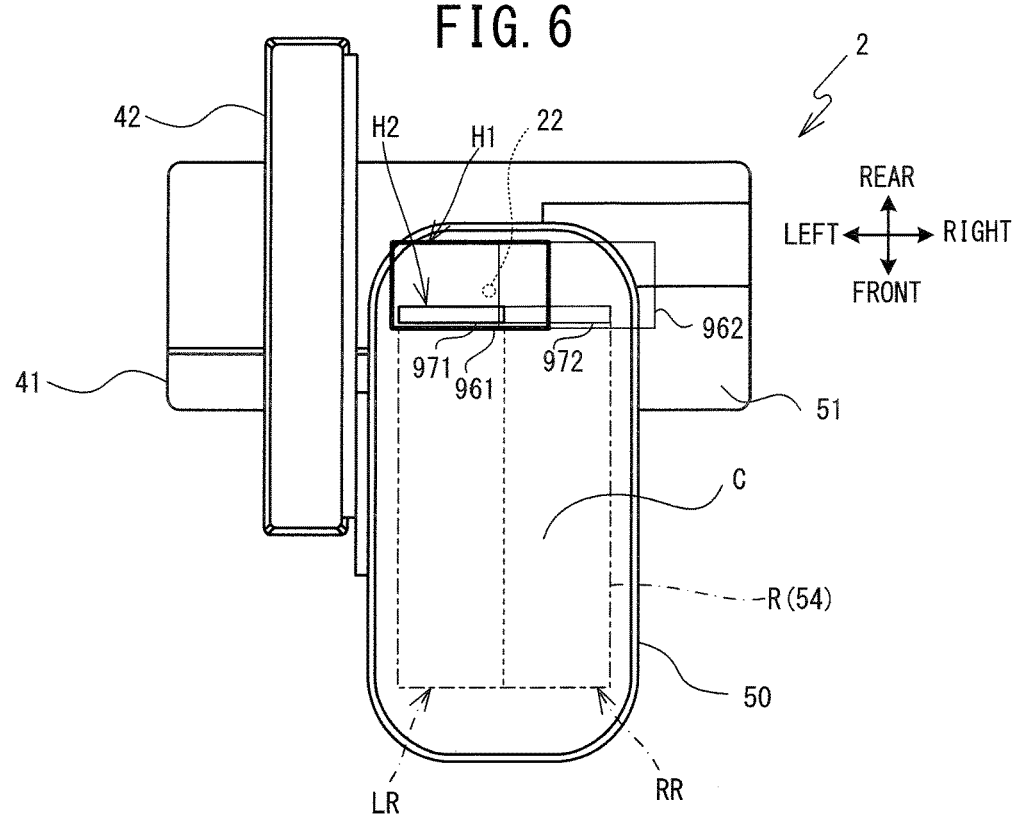
FIG. 6 is an explanatory diagram illustrating relationships between an image capture range, a specified range, and a relative position of an object to be captured with respect to an image sensor.
Figure 6:
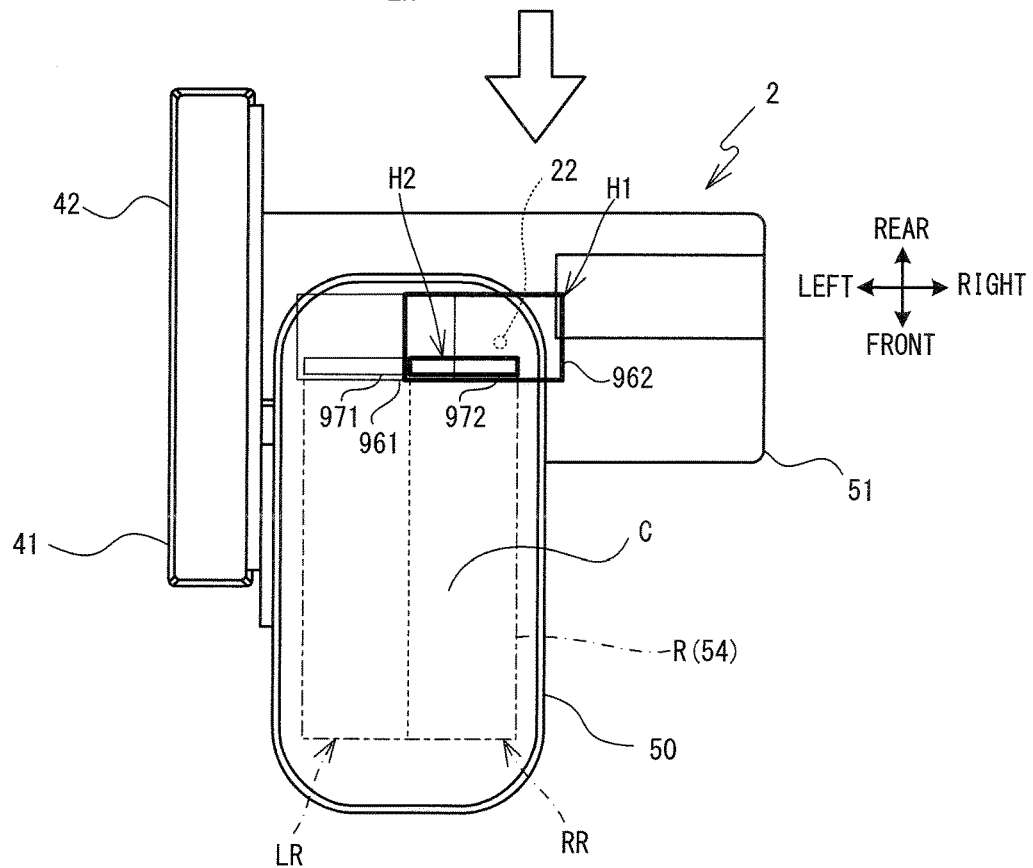
Figure 7:
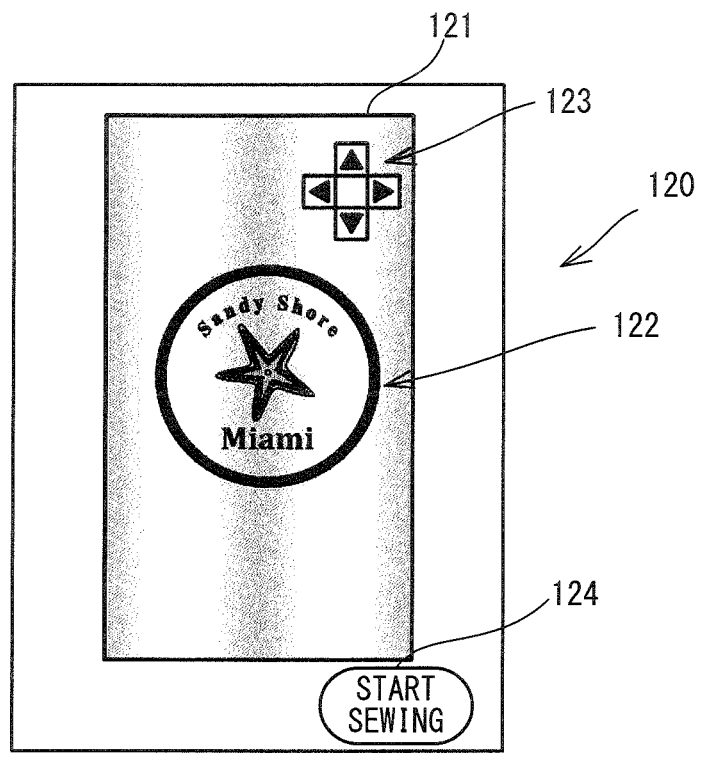
FIG. 7 is an explanatory figure of a screen.
Figure 8:
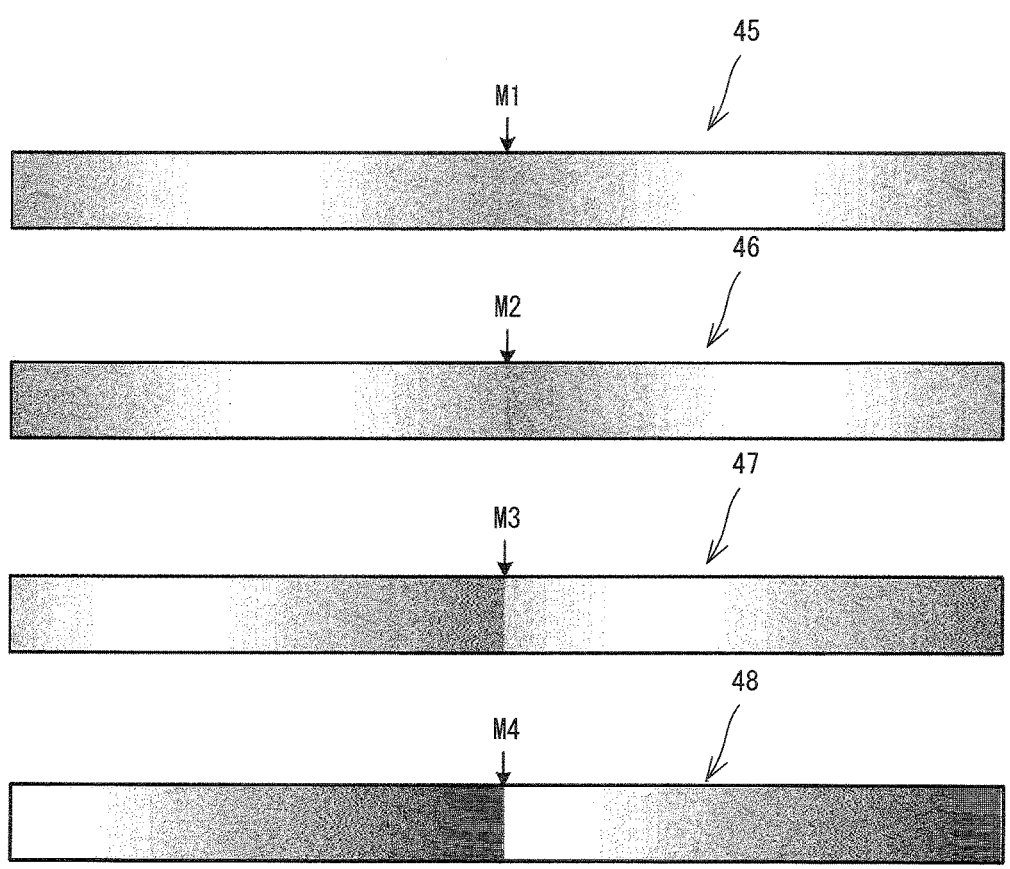
FIG. 8 is an explanatory diagram of a composite image.

A whole area that is captured by the image sensor 35 in a single image capture is referred to as an image capture range H1 (refer to FIG. 6). In the image sensor 35 of the present embodiment, the number of the image pickup elements 37 aligned in the main scanning direction is larger than the number of the image pickup elements 37 aligned in the sub-scanning direction. In other words, the number of pixels in the main scanning direction is larger than the number of pixels in the sub-scanning direction. As a result, the image capture range H1 has a rectangular shape that is longer in the main scanning direction than in the sub-scanning direction. As an example, the image sensor 35 of the present embodiment is an area sensor having 1280 pixels in the main scanning direction and 720 pixels in the sub-scanning direction. The image capture range H1 is narrower than a target range R to be described later.

The image sensor 35 is disposed such that the image sensor 35 can capture an image of an area including an area below the needle bar 6, and can generate image data. The output image data may be stored in a predetermined storage area of a RAM 63 (refer to FIG. 3). A coordinate system of the image represented by the image data generated by the image sensor 35 (hereinafter also referred to as an "image coordinate system") and a coordinate system of a whole space (hereinafter also referred to as a "world coordinate system") are associated with each other in advance using parameters stored in a flash memory 64 (refer to FIG. 3). The world coordinate system and the embroidery coordinate system are associated with each other in advance using parameters stored in the flash memory 64. Thus, the sewing machine 1 is configured to perform processing that identifies coordinates of the embroidery coordinate system on the basis of the image data generated by the image sensor 35.

The image sensor 35 of the present embodiment has a function that generates the image data for which white balance is corrected. More specifically, the image sensor 35 has an auto white balance function (AWB) and a function of a manual white balance function (MWB). The AWB is a function that performs color temperature correction of the image data using a determined white balance value (a determined WB value) determined on the basis of color information of the image data. The MWB is a function that performs the color temperature correction of the image data using a set white valance value (a set WB value). The set WB value is a white balance value (a WB value) set by the CPU 61. The color information is information indicating color. The color information of the present embodiment is represented by gradation values (numerical values from 0 to 255) of the three primary colors of red (R), green (G) and blue (B).

An electrical configuration of the sewing machine 1 will be explained with reference to FIG. 3. The sewing machine 1 is provided with the CPU 61, a ROM 62, the RAM 63, the flash memory 64 and an input/output interface (I/O) 66. The CPU 61 is connected to the ROM 62, the RAM 63, the flash memory 64 and the I/O 66, via a bus 65.

The CPU 61 performs overall control of the sewing machine 1 and executes various types of calculations and processing that relate to image capture and sewing, in accordance with various programs stored in the ROM 62. Although not shown in the drawings, the ROM 62 is provided with a plurality of storage areas including a program storage area. The program storage area stores the various programs to operate the sewing machine 1 (for example, a program to perform main processing to be described later).

The RAM 63 may include a storage area to store calculation results etc. of arithmetic processing by the CPU 61 as necessary. The flash memory 64 may store the various parameters and the like that are used for the sewing machine 1 to perform the various processing. Drive circuits 71 to 74, the touch panel 26, the start/stop switch 29, and the image sensor 35 are connected to the I/O 66. The detector 36 is configured to detect that the embroidery frame 50 has been mounted on the movement mechanism 40, and is configured to output a detection result corresponding to the type of the embroidery frame 50.

The drive shaft motor 81 is connected to the drive circuit 71. The drive circuit 71 may drive the drive shaft motor 81 in accordance with a control signal from the CPU 61. The needle bar up-and-down movement mechanism 34 (refer to FIG. 2) may be driven via the drive shaft (not shown in the drawings) of the sewing machine 1 in accordance with the driving of the drive shaft motor 81, and the needle bar 6 may be thus moved up and down. The X axis motor 83 is connected to the drive circuit 72. The Y axis motor 84 is connected to the drive circuit 73. The drive circuits 72 and 73 may drive the X axis motor 83 and the Y axis motor 84, respectively, in accordance with a control signal from the CPU 61. The embroidery frame 50 may be moved in the left-right direction (the X axis direction) and in the front-rear direction (the Y axis direction) in accordance with the driving of the X axis motor 83 and the Y axis motor 84, by a movement amount that corresponds to the control signal. The drive circuit 74 may cause an image to be displayed on the LCD 15 by driving the LCD 15 in accordance with a control signal from the CPU 61.

Operations of the sewing machine 1 will be explained briefly. When embroidery sewing is performed using the embroidery frame 50, the needle bar up-an-down movement mechanism 34 (refer to FIG. 2) and the shuttle mechanism (not shown in the drawings) are driven in accordance with the movement of the embroidery frame 50 in the X axis direction and the Y axis direction by the movement mechanism 40. Thus, an embroidery pattern is sewn on the sewing workpiece C held by the embroidery frame 50, using the sewing needle 7 mounted on the needle bar 6.

The main processing of the sewing machine 1 will be explained with reference to FIG. 4 to FIG. 8. In the main processing, positioning of the sewing workpiece C held by the embroidery frame 50 with respect to the embroidery pattern to be sewn, and sewing of the embroidery pattern in accordance with a result of the positioning are performed. An image obtained by capturing an image of the sewing workpiece C within the sewing area 54 is used in the processing for the positioning of the sewing workpiece C with respect to the embroidery pattern. The main processing is activated when a user inputs, through a panel operation, an instruction to select the embroidery pattern to be sewn. When the CPU 61 detects the instruction, the CPU 61 reads out, to the RAM 63, the program to perform the main processing stored in the program storage area of the ROM 62. The CPU 61 performs the following steps in accordance with instructions included in the program read out to the RAM 63. Various parameters necessary to perform the main processing are stored in the flash memory 64. Various data obtained in the course of the main processing are stored in the RAM 63 as appropriate. Hereinafter, in order to simplify the explanation, a case will be described in which the embroidery frame 50 holding the sewing workpiece C, which is a white cloth, is mounted on the movement mechanism 40 before the main processing is started.

Figure 4:
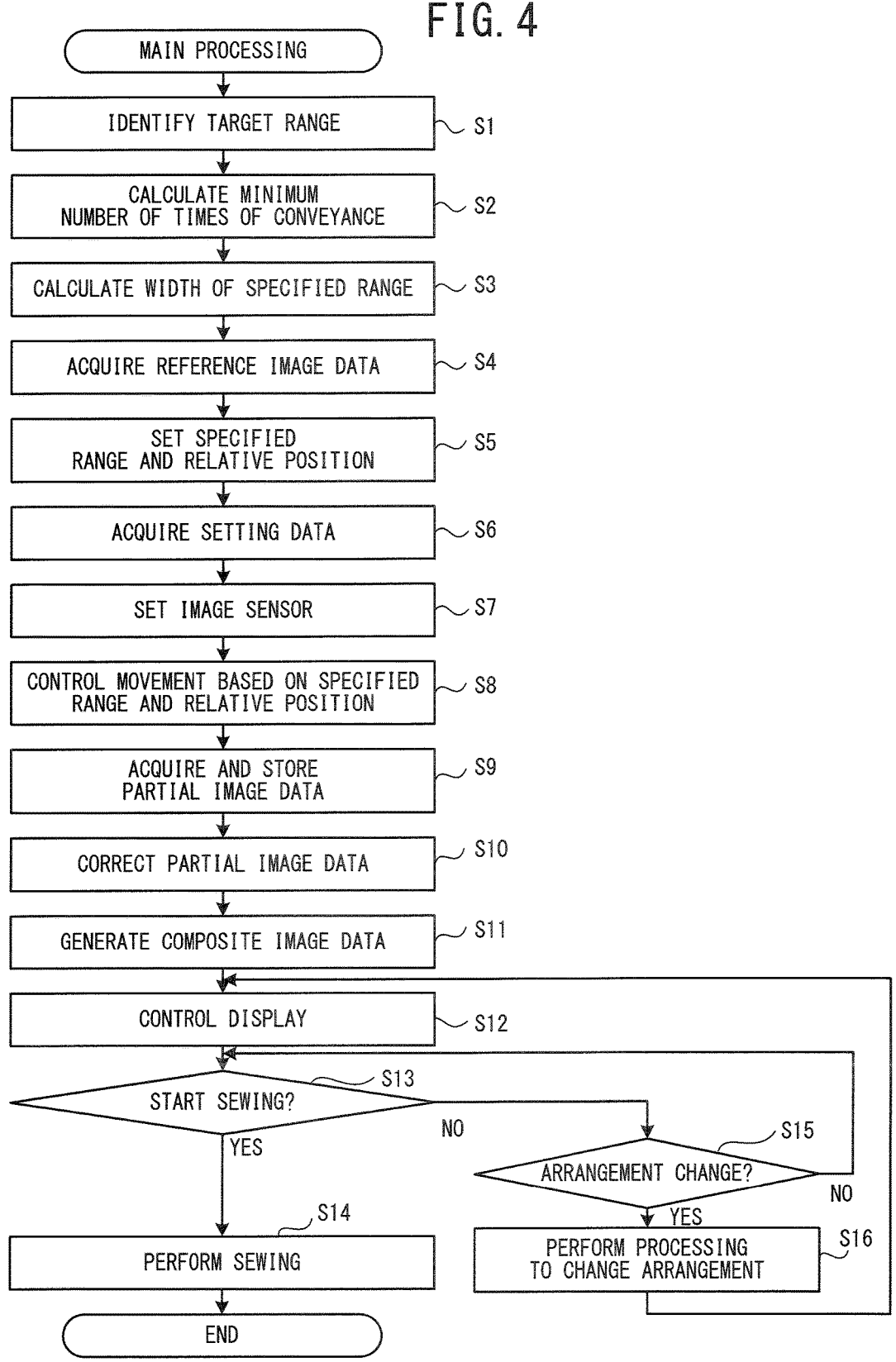
FIG. 4 is a flowchart of main processing.

In the main processing shown in FIG. 4, the CPU 61 identifies the target range R (step S1). The target range R is a range within which the image capture by the image sensor 35 is possible by the movement mechanism 40 conveying the object to be captured (the sewing workpiece C in the present embodiment) held by the embroidery frame 50 relative to the image sensor 35, and is a range wider than the image capture range H1. The CPU 61 of the present embodiment identifies the type of the embroidery frame 50 on the basis of the detection result of the detector 36, and identifies the sewing area 54 of the embroidery frame 50 as the target range R. The association between the type of the embroidery frame 50 and the sewing area 54 is stored in advance in the flash memory 64. The CPU 61 of the present embodiment identifies the target range R on the basis of the number of pixels of the image sensor 35. At step S1, for example, a range whose size in the left-right direction is 1600 pixels and whose size in the front-rear direction is 850 pixels is identified as the target range R.

The CPU 61 calculates a minimum number of times of conveyance (step S2). The sewing machine 1 of the present embodiment generates a composite image representing the whole of the target range R in the following manner. In the sewing machine 1, the image sensor 35 captures an image of a part of the target range R while the movement mechanism 40 is conveying the embroidery frame 50, which is holding the object to be captured, in the front-rear direction (a first direction) relative to the image sensor 35, without changing a position of the image sensor 35 in the left-right direction. The sewing machine 1 repeats the same processing by changing a relative position of the object to be captured with respect to the image sensor 35 in the left-right direction (a second direction). The minimum number of times of conveyance is a minimum number of times of conveyance in the front-rear direction while performing image capture, when the whole of the target range R identified at step S1 is captured. In a specific example, the size of the target range R in the left-right direction is 1600 pixels and the size of the image capture range H1 in the left-right direction is 1280 pixels. The CPU 61 sets the minimum number of times of conveyance to 2, which is an integer obtained by rounding up a quotient obtained by dividing the size of the target range R in the left-right direction by the size of the image capture range H1 in the left-right direction. The minimum number of times of conveyance does not include the number of times at which the object to be captured is conveyed in the front-rear direction without performing the image capture.

The CPU 61 calculates a width H2W of a specified range H2 in the main scanning direction (step S3). The specified range H2 is a range within the image capture range H1, and is set such that the whole of the target range R identified at step S1 can be captured by conveying the object to be captured in the front-rear direction relative to the image sensor 35 the minimum number of times of conveyance calculated at step S2. In the present embodiment, the CPU 61 generates a plurality of partial image data representing partial images captured in the specified range H2 within the image capture range H1. The CPU 61 synthesizes the plurality of generated partial image data and generates composite image data representing the whole of the target range R. In the present embodiment, the length of the specified range H2 in the main scanning direction (the left-right direction) is the same for each of the conveyances in which the relative positions in the left-right direction of the image sensor 35 and the object to be captured are different from each other. Specifically, the CPU 61 divides a width H1W of the target range R in the main scanning direction by the minimum number of times of conveyance, and thus obtains 800 pixels as the width H2W of the specified range H2 in the main scanning direction.

The CPU 61 acquires reference image data (step S4). The reference image data represents a reference image 95 (refer to FIG. 5) formed by a plurality of pixels, which is generated by the image sensor 35 capturing an image of a color reference member. The color reference member is a member that is used as a color reference, and is a known planar reflector plate, for example. The reference image data is data representing shades of color caused by, for example, factors of the environment in which the sewing machine 1 is used. The reference image data is used to set the specified range H2. The reference image data at step S4 of the present embodiment is image data obtained by the image sensor 35 capturing an image of a member used as a white reference. The reference image data is represented by a gray scale value of each of the plurality of pixels. The reference image data is generated by the image sensor 35 capturing an image of the color reference member at the time of factory shipment, for example, and is stored in the flash memory 64. The reference image data is data that reflects an installation tolerance or the like of the image sensor 35, and is different for each unit of the sewing machine 1.

The CPU 61 sets the specified range H2 and the relative position (step S5). The CPU 61 sets the specified range H2 based on color information of the reference image data representing the reference image 95 formed by a plurality of pixels, which is generated by the image sensor 35 capturing the image of the color reference member and is acquired at step S4. The CPU 61 of the present embodiment sets the specified range H2 using, as the color information, the gray scale value of each of the plurality of pixels represented by the reference image data. The CPU 61 of the present embodiment sets, as the specified range H2, the same range within the image capture range H1, regardless of the relative position of the object to be captured with respect to the image sensor 35. The relative position is a position in the left-right direction of the object to be captured (the embroidery frame 50) with respect to the image sensor 35, and corresponds to the specified range H2. The CPU 61 of the present embodiment identifies the gray scale value of each of a plurality of target pixels, on the basis of the gray scale values of the reference image 95 represented by the reference image data acquired at step S4. The plurality of target pixels are a plurality of pixels aligned in the main scanning direction, among the plurality of pixels that form the reference image 95. A plurality of pixels positioned at a specified position in the sub-scanning direction of the reference image 95 (for example, a plurality of pixels positioned at the center in the sub-scanning direction of the reference image 95 represented by the gray scale) are used as the plurality of target pixels. The gray scale value of the present embodiment is a gradation value that is represented by 256 levels from 0 to 255. In comparison to when the gray scale value is small, the larger the gray scale value, the closer to white.

Figure 5:
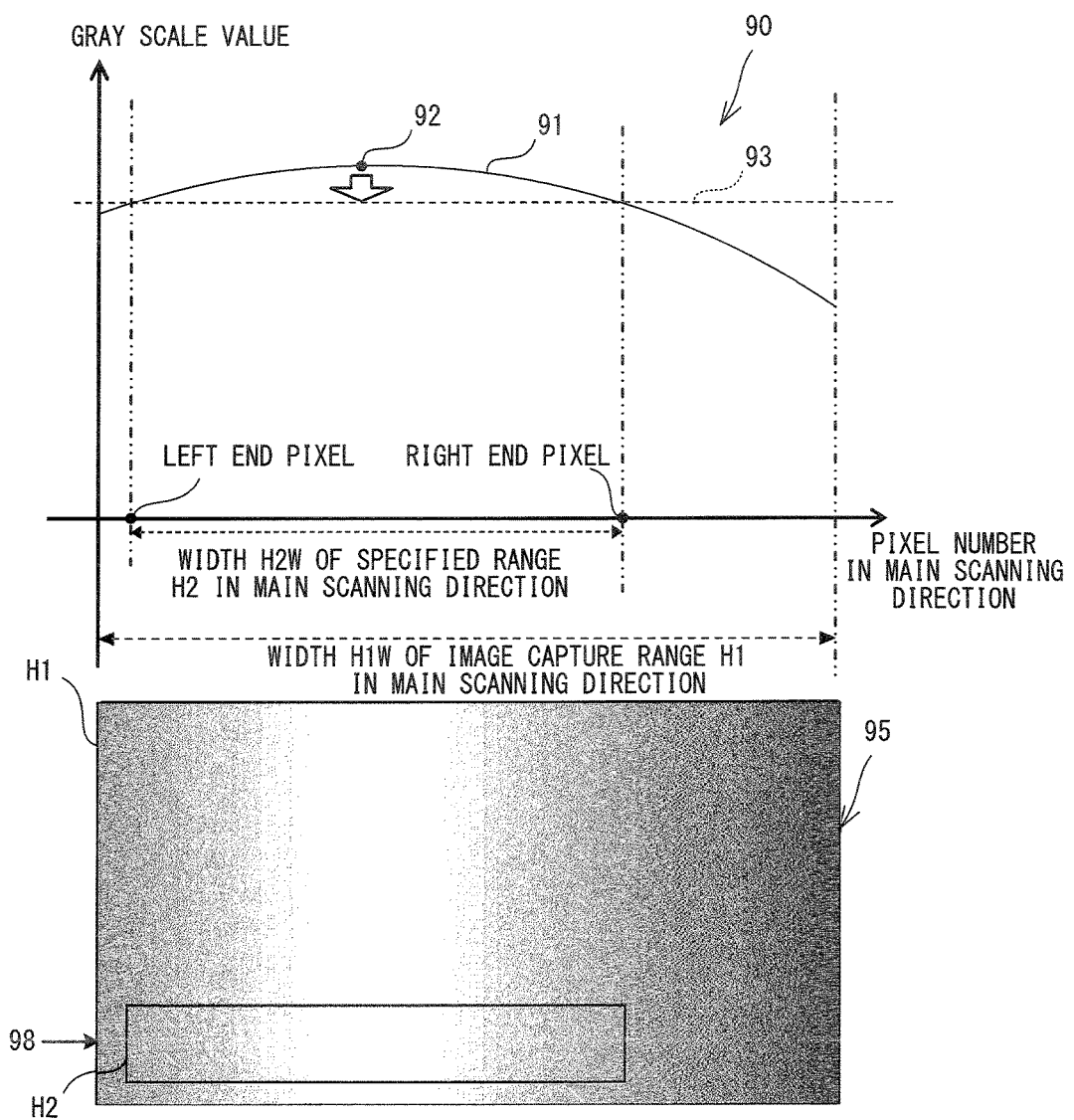
FIG. 5 is a graph showing a relationship between a pixel number in a main scanning direction and a gray scale value.

In a graph 90 shown in FIG. 5, pixel numbers allocated in the main scanning direction (the left-right direction) of the reference image 95 represent the horizontal axis, and the magnitude of the gray scale value represents the vertical axis. Thus, the graph 90 shows changes in the gray scale values of the plurality of target pixels. The gray scale value corresponding to each of the plurality of target pixels indicates the gray scale value corresponding to a single pixel number (namely, a point on the horizontal axis shown in FIG. 5). As an example, the graph 90 including a curved line 91 in FIG. 5 shows changes in the gray scale values of the plurality of pixels aligned in the main scanning direction at a position 98 on the front side in the sub-scanning direction of a gray scale image. In the present embodiment, the specified range H2 in the sub-scanning direction is set in advance, and the position 98 is the center of the specified range H2 in the sub-scanning direction. The changes in the gray scale values are caused by factors (such as ambient brightness, light source difference and the like) of the environment in which the sewing machine 1 is used.

On the basis of the identified gray scale values of the plurality of target pixels, the CPU 61 acquires a highest value 92. The highest value 92 corresponds to a value that is closest to white. The CPU 61 identifies intersection points of a gray scale value 93 and the curved line 91 when the gray scale value 93 gradually lowers from the highest value 92. In the present embodiment, there are two intersection points of the gray scale value 93 and the curved line 91. When there are three or more intersection points of the gray scale value 93 and the curved line 91, the CPU 61 selects, from among the three or more intersection points, two intersection points for which the distance between them is largest. The CPU 61 identifies, as the specified range H2 in the main scanning direction, a range in which the distance between one of the two intersection points that is on one side in the main scanning direction and the intersection point on the other side corresponds to 800 pixels, which is the width H2W of the specified range H2 in the main scanning direction calculated at step S3.

When pixels having the same gray scale value are set at both ends of the specified range H2, when the specified range H2 has a narrower width than the width H2W of the specified range H2 in the main scanning direction calculated at step S3, the CPU 61 identifies the specified range H2 to have gray scale values such that a difference between the gray scale values at both the ends of the specified range H2 in the main scanning direction is within a predetermined threshold value (±10%, for example). In this manner, the CPU 61 sets, as the specified range H2, a range which includes the pixel, among the plurality of pixels, whose gray scale value is the value closest to white (the highest value 92), and in which the difference between the gray scale values of the pixels at both the ends in the main scanning direction is equal to or less than a predetermined value. By capturing an image of the specified range H2 on the basis of the identified specified range H2, the CPU 61 identifies the relative position in the left-right direction of the object to be captured (the embroidery frame 50) with respect to the image sensor 35, in order to represent the whole of the target range R. A relationship between the range of the object to be captured (the embroidery frame 50) that falls within the image capture range H1 and the relative position is stored in advance in the flash memory 64. The CPU 61 refers to the relationship between the range of the object to be captured that falls within the image capture range H1 and the relative position, and identifies the relative position in the left-right direction of the object to be captured (the embroidery frame 50) with respect to the image sensor 35, in order to capture the specified range H2.

In the specific example, the specified range H2 is set with respect to the image capture range H1 that corresponds to the whole of the reference image 95 in FIG. 5. As shown in the upper section of FIG. 6, at the time of a first conveyance, the relative position in the main scanning direction (the left-right direction) of the object to be captured (the embroidery frame 50) with respect to the image sensor 35 is a position in which the image sensor 35 can capture an image of a range 961 of the object to be captured. From among the image data obtained by capturing the image of the range 961, partial image data representing a range 971 are used to generate the composite image data representing the whole of the target range R. A left half LR of the target range R is represented by a plurality of partial images obtained by the first conveyance in the main scanning direction. As shown in the lower section of FIG. 6, at the time of a second conveyance, the relative position in the sub-scanning direction of the object to be captured (the embroidery frame 50) with respect to the image sensor 35 is a position in which the image sensor 35 can capture an image of a range 962 of the object to be captured. Of the image data obtained by capturing the image of the range 962, partial image data representing a range 972 are used to generate the composite image data. A right half RR of the target range R is represented by a plurality of partial images obtained by the second conveyance in the main scanning direction.

The CPU 61 acquires setting data of the image sensor 35 stored in the flash memory 64 (step S6). The setting data include data used in the MWB, and data used in processing that corrects the image data acquired from the image sensor 35. The setting data of the present embodiment are a WB value, white reference image data and black reference image data. The WB value acquired at step S6 is a default value or a value stored in latest color reference data processing. The default value is a value that is determined on the basis of the image data obtained by the image sensor 35 capturing the image of the color reference member at the time of factory shipment of the sewing machine 1. The color reference data processing is performed separately from the main processing, and is processing that determines the WB value on the basis of the image data obtained by the image sensor 35 capturing the image of the color reference member. The white reference image data is image data obtained by the image sensor 35 capturing an image of a member used as the white reference. The member used as the white reference may be the same as the member used to obtain the reference image data at step S4, or may be a different member. The black reference image data is image data obtained by the image sensor 35 capturing an image of a member used as a black reference. Each of the white reference image data and the black reference image data is a default value or a value stored in the latest color reference data processing. The white reference image data and the black reference image data are data for which the white balance is adjusted using the acquired WB value. While the reference image data at step S4 is represented by gray scale values, the white reference image data is represented by gradation values (numerical values from 0 to 255) of the three primary colors of red (R), green (G) and blue (B).

The CPU 61 sets the AWB of the image sensor 35 to OFF, and sets the MWB of the image sensor 35, which changes the WB value acquired at step S6 to the set WB value, to ON (step S7).

The CPU 61 controls the drive circuits 72 and 73 to move the embroidery frame 50 (step S8). The CPU 61 moves the embroidery frame 50 to an image capture start position (the upper section of FIG. 6) at the relative position in the left-right direction of the first conveyance identified at step S5, and after that, the CPU 61 moves the embroidery frame 50 rearward at a constant speed. The CPU 61 moves the embroidery frame 50 to an image capture end position at the relative position in the left-right direction of the first conveyance identified at step S5, and then moves the embroidery frame 50 to an image capture start position (the lower section of FIG. 6) at the relative position in the left-right direction of the second conveyance identified at step S5. The CPU 61 moves the embroidery frame 50 rearward at the constant speed. The CPU 61 moves the embroidery frame 50 to an image capture end position at the relative position in the left-right direction of the second conveyance identified at step S5. The relative position in the front-rear direction may be the same for the image capture end position of the first conveyance and the image capture end position of the second conveyance.

In synchronization with the movement of the embroidery frame 50, the CPU 61 causes the image sensor 35 to continuously capture images of the target range R, and obtains the plurality of partial image data (step S9). More specifically, while the embroidery frame 50 is being moved from the image capture start position of the first conveyance to the image capture end position of the first conveyance, the image sensor 35 partially captures the target range R a plurality of times, taking the image capture range H1 as a unit of each image capture. Thus, the image sensor 35 captures the whole of the left half LR of the target range R. While the embroidery frame 50 is being moved from the image capture start position of the second conveyance to the image capture end position of the second conveyance, the image sensor 35 partially captures the target range R a plurality of times, taking the image capture range H1 as the unit of each image capture. Thus, the image sensor 35 captures the whole of the right half RR of the target range R. Further, the image sensor 35 corrects the plurality of obtained image data using the set WB value set at step S7. The CPU 61 acquires the plurality of corrected image data from the image sensor 35. Of the plurality of corrected image data, the CPU 61 acquires the data representing the images corresponding to the specified range H2 identified at step S5, as the plurality of partial image data. Through the processing at step S8 and step S9, the image sensor 35 is caused to capture the image of the object to be captured while the object to be captured is being conveyed in the first direction relative to the image sensor 35 at the relative position set at step S5, and the processing that generates the plurality of partial image data representing the plurality of partial images captured in the specified range H2 of the image sensor 35 is performed the minimum number of times of conveyance.

The CPU 61 corrects the plurality of partial image data stored at step S9, on the basis of the white reference image data and the black reference image data (step S10). In the present embodiment, the CPU 61 performs known shading correction with respect to each of the plurality of partial image data, on the basis of the white reference image data and the black reference image data acquired at step S6. More specifically, of the white reference image data acquired at step S6, a portion corresponding to the specified range H2 identified at step S5 is used in the following shading correction. In a similar manner, of the black reference image data acquired at step S6, a portion corresponding to the specified range H2 identified at step S5 is used in the following shading correction.

The procedure of the shading correction will be explained briefly using a specific example. An image represented by the white reference image data is referred to as a white reference image, and an image represented by the black reference image data is referred to as a black reference image. On the basis of the white reference image data, the gradation values of R, G and B of a pixel of an N-th row and an M-th column (where N and M are natural numbers), among a plurality of pixels in a matrix form that configure the white reference image, are acquired. In a similar manner, on the basis of the black reference image data, the gradation values of R, G and B of the pixel of the N-th row and the M-th column, among a plurality of pixels in a matrix form that configure the black reference image, are acquired. On the basis of the partial image data, the gradation values of R, G and B of the pixel of the N-th row and the M-th column, among a plurality of pixels in a matrix form that configure the partial image, are acquired. When, in the pixel of the N-th row and the M-th column, the gradation value of the white reference image data is denoted by W, the gradation value of the black reference image data is denoted by B, and the gradation value of the partial image data is denoted by S, corrected data D is obtained using the following formula.

$$\text{Corrected data } D=(S-B)\times 255/(W-B)$$

When the gradation values W are (240, 232, 238), the gradation values B are (10, 5, 9), and the gradation values S are (54, 152, 43), the CPU 61 calculates the corrected data D for each of the values (R, G, B) in the following manner.

$$R=(54-10)\times 255/(240-10)=49$$

$$G=(152-5)\times 255/(232-5)=165$$

$$B=(43-9)\times 255/(238-9)=38$$

The CPU 61 performs the above-described calculation for all the pixels included in each image.

Through the processing at step S10, each of the plurality of partial image data is corrected on the basis of the white reference image data and the black reference image data obtained by the image capture under the same image capture conditions (such as brightness, a light source etc.) as the plurality of partial image data. More specifically, using the white reference image data and the black reference image data, the plurality of partial images are color-corrected so as to suppress the influence due to an actual use environment of the sewing machine 1. Therefore, the sewing machine 1 can acquire the plurality of partial image data that are expressed using appropriate colors so that the hue of the image is natural.

Further, at step S10, of the white reference image data and the black reference image data, the portion corresponding to the specified range H2 identified at step S5 is used for the shading correction of the plurality of partial image data. Both the ends in the main scanning direction of the specified range H2 identified at step S5 correspond to gray scale values that are the same as or similar to each other in the gray scale image of the reference image 95 (refer to FIG. 5). Therefore, when the above-described shading correction is performed, the sewing machine 1 can perform the color correction substantially at the same level with respect to both the ends in the main scanning direction of each of the partial images.

The CPU 61 generates the composite image data representing the whole of the target range R, on the basis of the plurality of partial image data acquired at step S9 and corrected at step S10 (step S11). The composite image data is image data representing a single composite image that is obtained by synthesizing the plurality of partial images represented by the plurality of partial image data. For example, the composite image data is generated by the following procedure. The CPU 61 generates image data representing the image of the left half LR of the target range R, on the basis of the plurality of partial image data corresponding to each of the plurality of partial images obtained by the first conveyance. In a similar manner, the CPU 61 generates image data representing the image of the right half RR of the target range R, on the basis of the plurality of partial image data corresponding to each of the plurality of partial images obtained by the second conveyance. The CPU 61 generates the composite image data representing the composite image of the whole of the target range R, on the basis of the image data representing the image of the left half LR of the target range R and the image data representing the image of the right half RR of the target range R.

The CPU 61 displays the composite image on the LCD 15 on the basis of the composite image data generated at step S11 (step S12). The CPU 61 displays, for example, a screen 120 shown in FIG. 7. The screen 120 includes a composite image 121, an embroidery image 122, a group of arrangement change keys 123 and a start sewing key 124. The composite image 121 is an image that is represented by the composite image data generated at step S11. The embroidery image 122 is a finished image of an embroidery pattern selected before the start of the main processing. The group of arrangement change keys 123 is used to input an instruction to change the arrangement of the embroidery pattern with respect to the sewing workpiece C shown by the composite image 121. The start sewing key 124 is used to input an instruction to start processing that sews the embroidery pattern shown by the embroidery image 122 on the sewing workpiece C, in accordance with the arrangement displayed on the screen 120. The user inputs an instruction to start the sewing, by performing a panel operation or depressing the start/stop switch 29.

The CPU 61 stands by until the CPU 61 detects the instruction to start the sewing or the instruction to change the arrangement (no at step S13, no at step S15). When the CPU 61 detects the instruction to change the arrangement (no at step S13, yes at step S15), the CPU 61 changes the arrangement of the embroidery pattern on the basis of the instruction to change the arrangement (step S16). The CPU 61 displays the embroidery pattern in accordance with the changed arrangement (step S12). When the CPU 61 detects the instruction to start the sewing (yes at step S13), the CPU 61 controls the drive circuits 72 and 73 in accordance with the embroidery data, drives the movement mechanism 40 to move the embroidery frame 50. In synchronization with the driving control of the drive circuits 72 and 73, the CPU 61 drives the drive circuit 71 to drive the needle bar up-and-down movement mechanism 34 (step S14). Thus, in accordance with the embroidery data, a plurality of stitches representing the embroidery pattern are formed on the sewing workpiece C held by the embroidery frame 50. Then, the sewing machine 1 ends the main processing Joints of composite images generated by the sewing machine 1 will be explained with reference to FIG. 8. In composite images 45 to 48, the target range R and the width H2W of the specified range H2 in the main scanning direction are the same. In the composite images 45 to 48, positions in the main scanning direction of the specified range H2 with respect to the image capture range H1 are different from each other. The composite image 45 is a part of a composite image obtained by setting the specified range H2 in accordance with the main processing. The composite image 46 is a part of a composite image obtained by setting the left end of the specified range H2 to the left end of the image capture range H1. The composite image 47 is a part of a composite image obtained by setting the center of the specified range H2 to the center of the image capture range H1. The composite image 48 is a part of a composite image obtained by setting the right end of the specified range H2 to the right end of the image capture range H1. In other words, in the composite images 46 to 48, when the specified range H2 is identified, the color information of both the ends in the main scanning direction is not taken into consideration. As a result, in each of the composite images 46 to 48, a difference in shades of color occurs at joints M2 to M4 of the partial images synthesized so as to be aligned in the main scanning direction (the left-right direction). Meanwhile, in the composite image 45, a difference in shades of color does not occur at a joint M1 of the partial images synthesized so as to be aligned in the main scanning direction (the left-right direction). This is because, as a result of the CPU 61 performing each of the above-described processing, the specified range H2 is set such that the color information of both the ends in the main scanning direction of each of the partial images is substantially the same.

On the basis of the reference image data obtained by the image sensor 35 capturing the image of the color reference member, the sewing machine 1 sets the specified range H2 such that the image capture of the whole of the target range R is possible with the minimum number of times of conveyance. Therefore, the sewing machine 1 can generate the composite image data quickly while suppressing the difference in shades of color from occurring at the joints between the partial images. The sewing machine 1 of the present embodiment stores the reference image data in the flash memory 64. Therefore, there is no need for the sewing machine 1 to cause the image sensor 35 to capture the image of the color reference member every time the main processing is performed, and it is possible to simplify the processing in comparison to when the processing to generate the reference image data is performed every time the main processing is performed.

The sewing machine 1 determines the specified range H2 using the gray scale values of the reference image data as the color information. The gray scale values favorably represent the shading due to the ambient brightness, the light source difference and the like. Therefore, the sewing machine 1 can appropriately determine the specified range H2 using the gray scale values as the color information. In comparison to when the specified range H2 is determined on the basis of the color information represented by color, the sewing machine 1 can speed up the processing that determines the specified range H2 on the basis of the color information.

With the sewing machine 1, when gray scale conversion is performed, the difference between the gray scale values at both the ends in the main scanning direction of the partial image represented by the partial image data is equal to or less than the predetermined value. When the gray scale conversion is performed, the gray scale values represent the luminance and brightness. Therefore, the sewing machine 1 can suppress the difference in shades of color from occurring at the joints between the partial images in the main scanning direction.

The sewing machine 1 sets, as the specified range H2, the range including the pixel whose gray scale value is the highest value of 92, namely, the value closest to white. Thus, with the sewing machine 1, it is possible to set, as the specified range H2, the range including the brightest section inside the image capture range H1. In comparison to when the specified range H2 does not include the pixel whose gray scale value is the value closest to white, the sewing machine 1 can generate the composite image data by which the situation of the object to be captured is easily understood.

The sewing machine 1 sets, as the specified range H2, the same range with respect to the image capture range H1, regardless of the relative position in the main scanning direction. The positional relationship of the range 971 with respect to the range 961 is the same as the positional relationship of the range 972 with respect to the range 962. In comparison to a case in which image capture is performed using the specified range H2 that is different for each relative position, the sewing machine 1 can make the shades of color more uniform in the main scanning direction within the composite image represented by the composite image data. The sewing machine 1 stores the white reference image data and the black reference image data in the flash memory 64. Therefore, on the basis of the color reference data, the sewing machine 1 can appropriately express the color (particularly, the white color and a color close to white) of the object to be captured. The CPU 61 performs the known shading correction using the reference image data, and thus can obtain an image in which color shading and illuminance unevenness are reduced in comparison to those before the correction.

The sewing machine 1 matches the WB value used when acquiring the white reference image data and the black reference image data with the WB value used when acquiring the partial image data. The sewing machine 1 can improve a correction accuracy of the image data and the plurality of partial images, in comparison to when the white balance of the captured image is adjusted using the WB value that is different for each image capture (for each image data). In other words, the sewing machine 1 can generate a composite image that is expressed using appropriate colors so that the hue of the image is natural. For example, when the user wants to arrange the embroidery pattern in accordance with the arrangement of a pattern of the sewing workpiece C, the user can grasp an image of the finished embroidery more accurately and can accurately arrange the embroidery pattern.

The sewing machine according to the present disclosure is not limited to the embodiments described above, and various types of modifications may be made insofar as they are within the scope of the present disclosure. For example, the modifications (A) to (C) described below may be made as desired.

(A) The configuration of the sewing machine 1 may be changed as desired. The sewing machine 1 may be an industrial-use sewing machine or a multi-needle sewing machine. As long as the image capture portion is a device capable of capturing an image, the image capture portion may be a line sensor in which a plurality of the image pickup elements 37 are aligned in the main scanning direction. It is sufficient that a conveyance portion can convey the object to be captured in the first direction and a direction that intersects the first direction, relative to the image capture portion. For example, the conveyance portion may be a feed dog that can feed the object to be captured in the front-rear direction and the left-right direction. The conveyance directions (the first direction and the second direction) in which the object to be captured is conveyed by the conveyance portion may be changed as desired.

(B) The programs that contain the instructions for performing the main processing (refer to FIG. 4) may be stored in a storage device of the sewing machine 1 before the sewing machine 1 executes the programs. Therefore, the methods by which the programs are acquired, the routes by which they are acquired, and the device in which the programs are stored may each be modified as desired. The data and the programs, which are executed by the CPU 61 the sewing machine 1, may be received from another device through one of a cable and wireless communications, and they may be stored in a storage device such as a flash memory or the like. The other device may be, for example, a personal computer or a server that is connected through a network.

(D) The individual steps in the main processing (refer to FIG. 4) may not necessarily be performed by the CPU 61, and some or all of the steps may also be performed by another electronic device (for example, an ASIC). The individual steps of the main processing may also be performed by distributed processing among a plurality of electronic devices (for example, a plurality of CPUs). The order of the individual steps in the main processing can be modified as necessary, and steps can be omitted and added. Furthermore, a case in which an operating system (OS) or the like that is operating in the sewing machine 1 performs some or all of the actual processing, based on commands from the CPU 61 of the sewing machine 1, and the functions of the embodiment that is described above are implemented by that processing, falls within the scope of the present invention. The modifications hereinafter described in paragraphs (C-1) to (C-5) may also be applied to the main processing as desired.

(C-1) The reference image data acquired at step S4 is not limited to the data represented by the gray scale value of each of the plurality of pixels, and may be information indicating another color space (for example, known HSV, HLS, or the like). The correction method of the image data at step S10 may be changed as desired. The color information of the image data may be represented by other than the gradation values of R, G and B. The reference image data at step S4 may be acquired by converting the gradation values of the white reference image data at step S6 to the gray scale values. In this case, the white reference image data and the reference image data may be stored separately. The specified range H2 in the sub-scanning direction may be set on the basis of the reference image data.

(C-2) At step S5, an average value of each of the gray scale values of the plurality of pixels corresponding to the same pixel number (namely, the plurality of pixels aligned in the sub-scanning direction), among the plurality of pixels that form the gray scale image, may be identified as the gray scale value of each of the target pixels. In this case, the graph 90 in FIG. 5 shows a state in which the average value of each of the gray scale values of the plurality of pixels aligned in the sub-scanning direction in the gray scale image changes in accordance with the position in the main scanning direction of the gray scale image. The specified range may be determined on the basis of a gray scale value of the plurality of pixels, such as a moving average value of the gray scale values of the pixels in the main scanning direction. In this case, for example, when there is unevenness in the gray scale values, it possible to avoid determining the specified range on the basis of a singular value.

Figure 9:
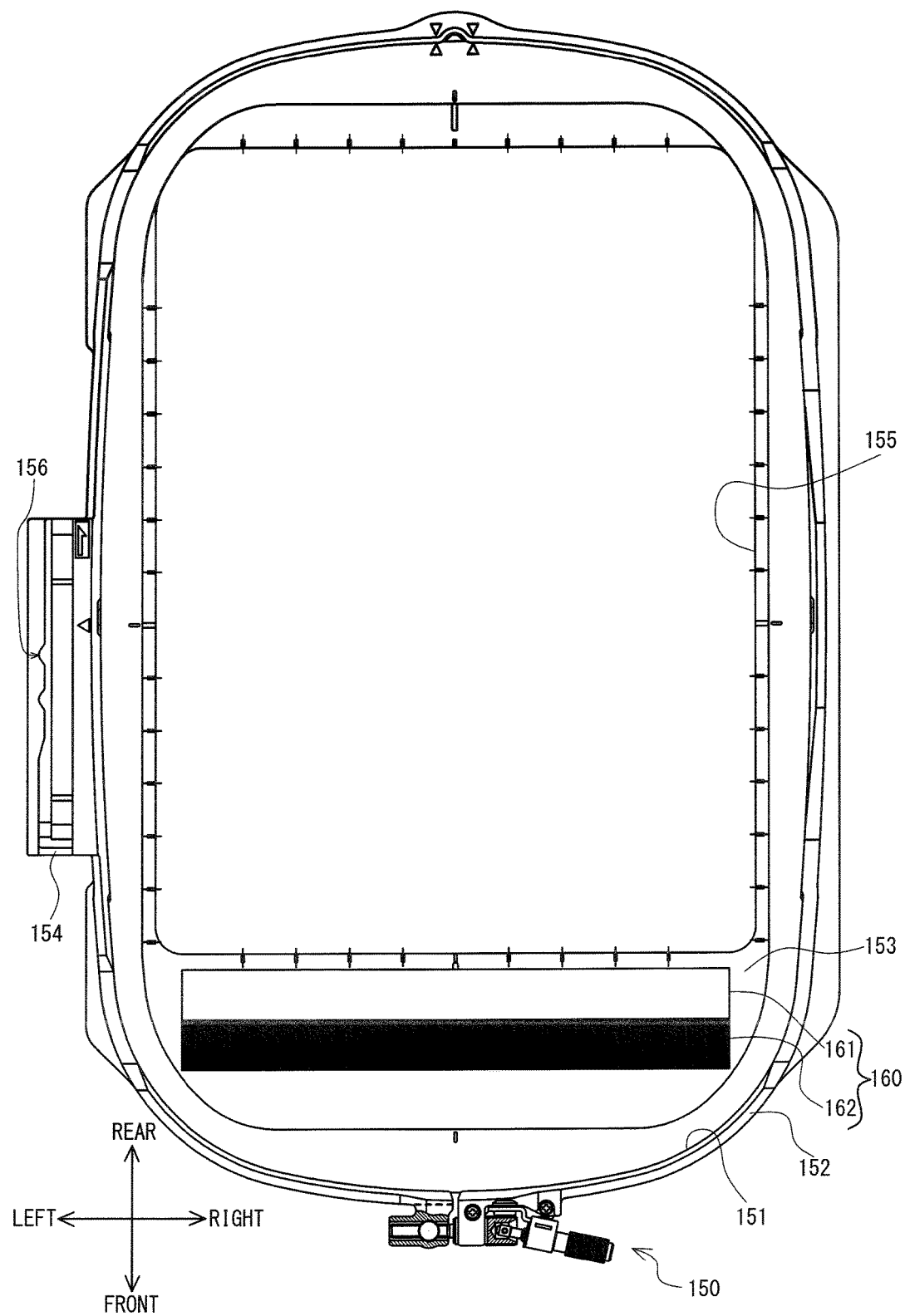
FIG. 9 is a plan view of an embroidery frame according to a modified example.

(C-3) In the main processing, the CPU 61 may generate the reference image data by capturing the image of the color reference member. An embroidery frame 150 having a color reference member will be explained with reference to FIG. 9. As shown in FIG. 9, the embroidery frame 150 has an inner frame 151 and an outer frame 152, and the inner frame 151 and the outer frame 152 clamp and hold a sewing workpiece. The embroidery frame 150 has a mounting portion 154 on the left side surface of the outer frame 152. The mounting portion 154 is configured such that it can be mounted on and removed from the movement mechanism 40 of the sewing machine 1. The mounting portion 154 is provided with a detection target portion 156. The detection target portion 156 has a shape that is specific to the embroidery frame 150. When the embroidery frame 150 is attached to the movement mechanism 40, the sewing machine 1 can determine that the embroidery frame 150 has been attached, on the basis of the shape of the detection target portion 156 detected by the detector 36 (refer to FIG. 3). When the sewing machine 1 detects that the embroidery frame 150 has been attached to the movement mechanism 40, the sewing machine 1 sets a sewing area corresponding to the embroidery frame 150 on the inside of an inner periphery 155 of the inner frame 151. The front side of the inner frame 151 has a flat surface portion 153. The flat surface portion 153 has a planar surface. In a state in which the sewing workpiece is held by the embroidery frame 150, the flat surface portion 153 is not covered by the sewing workpiece and is exposed such that the image capture by the image sensor 35 is possible.

The flat surface portion 153 of the embroidery frame 150 is provided with a color reference member 160. The color reference member 160 includes a white reference member 161 and a black reference member 162 that extend in the left-right direction. The white reference member 161 is a member that is used as the white reference. The black reference member 162 is a member that is used as the black reference. Each of the white reference member 161 and the black reference member 162 is a known reflector plate whose surface has a planar shape. Each of the white reference member 161 and the black reference member 162 may be formed by printing a coating material of a predetermined color on the flat surface portion 153, or may be formed by adhering a reflecting tape of a predetermined color to the flat surface portion 153. The white reference member 161 and the black reference member 162 extend in a short side direction (the left-right direction) of the embroidery frame 150, on the front side that is one end side in a long side direction of the embroidery frame 150. In addition to the reference image data acquired at step S4, the sewing machine 1 may generate the white reference image data and the black reference image data acquired at step S6 by capturing an image of the color reference member 160 of the embroidery frame 150, and may correct the partial image data on the basis of the image data obtained by capturing the image of the color reference member 160. The image represented by the image data generated by the image sensor 35 may be used to generate the embroidery data, for example, in addition to being used as a background image when the embroidery frame is arranged or edited. The embroidery frame that can be mounted on the sewing machine 1 need not necessarily have the structure shown in FIG. 9, and may be a known embroidery frame that has an upper frame and a lower frame and that clamps a sewing workpiece using the upper frame and the lower frame. In this case, it is desirable that the color reference member be provided on the upper frame.

When the sewing machine 1 is provided with the embroidery frame 150, the sewing machine 1 can set a specified range on the basis of the reference image data obtained by capturing at least a part of the color reference member 160 of the embroidery frame 150. Since the color reference member 160 is provided on the flat surface portion 153, there is no need for the user to prepare a color reference member separately from the embroidery frame 150. The color reference member 160 is provided in substantially the same plane as the plane on which the sewing workpiece is held. The embroidery frame 150 attached to the movement mechanism 40 is arranged parallel to the bed 11. Thus, the sewing machine 1 can cause the image sensor 35 to perform image capture of each of the color reference member 160 and the object to be captured held by the embroidery frame 150 under the condition that distances from the bed 11 are substantially the same. Since the color reference member 160 is disposed on the flat surface portion 153, it is exposed with respect to the image sensor 35 in a state in which the object to be captured is held by the embroidery frame 150. Therefore, after a simple operation of mounting the embroidery frame 150 holding the object to be captured on the movement mechanism 40, the user can cause the sewing machine 1 to set the specified range on the basis of the reference image data, by causing the sewing machine 1 to perform the same processing as that shown in FIG. 4. When the sewing machine 1 does not generate the white reference image data and the black reference image data that are acquired at step S6 by capturing the image of the color reference member 160, the color reference member 160 may include only the white reference member 161.

(C-4) At step S1, the target range R may be identified based on coordinates of the world coordinate system or the embroidery coordinate system. In this case, in accordance with the correspondence between the coordinates of the embroidery coordinate system stored in the flash memory 64 and the image coordinate system, the CPU 61 may convert a specified range represented by the embroidery coordinate system into a specified range of the image coordinate system. At step S5, the CPU 61 may set, as the specified range, a range that is different for each relative position. In this case, the specified range may be identified for each relative position such that pieces of color information of joint portions of the partial images are the same as or similar to each other. The CPU 61 may generate the composite image data from the partial image data such that the partial images partially overlap with each other. In this case, the CPU 61 may set the specified range while taking the overlapping portions into consideration. The CPU 61 need not necessarily set, as the specified range, the range including the pixel whose gray scale value is the value closest to white among the plurality of pixels of the reference image.

(C-5) The method for identifying the target range may be changed as desired. The CPU 61 may identify, for example, a range that is specified by the user performing a panel operation, as the target range.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A sewing machine comprising:
an image capture portion having a predetermined image capture range;
a conveyance portion configured to convey an object to be captured relative to the image capture portion;
a processor; and
a memory configured to store computer-readable instructions that, when executed by the processor, instruct the processor to perform processes comprising:
identifying a target range, the target range being a range wider than the image capture range, and being a range capable of being captured by the image capture portion as a result of the object to be captured being conveyed by the conveyance portion;
calculating a minimum number of times of conveyance in a first direction, when image capture of the whole of the target range is performed such that, while the conveyance portion is conveying the object to be captured in the first direction relative to the image capture portion, image capture of a part of the target range by the image capture portion is repeated by changing a relative position of the object to be captured with respect to the image capture portion in a second direction orthogonal to the first direction;
setting a specified range and the relative position corresponding to the specified range, on the basis of color information of reference image data representing a reference image, which is formed by a plurality of pixels and which is generated by the image capture portion capturing an image of a color reference member, the specified range being a range within the image capture range and being set such that the image capture of the whole of the target range is possible with the calculated minimum number of times of conveyance;
controlling the image capture portion and the conveyance portion so as to cause the image capture portion to capture an image of the object to be captured while conveying the object to be captured in the first direction relative to the image capture portion at the set relative position, and performing processing, the minimum number of times of conveyance, that generates a plurality of image data representing partial images captured in the specified range of the image capture portion; and
synthesizing the plurality of generated partial image data to generate composite image data representing the whole of the target range.

2. The sewing machine according to claim 1, wherein
the reference image data represents a gray scale value of each of the plurality of pixels; and
the setting includes determining the specified range using, as the color information, the gray scale value of each of the plurality of pixels represented by the reference image data.

3. The sewing machine according to claim 2, wherein
the setting includes setting, as the specified range, a range in which a difference between the gray scale values of pixels, of the plurality of pixels, at both ends of the range in the second direction is equal to or less than a predetermined value.

4. The sewing machine according to claim 2, wherein
the setting includes setting, as the specified range, a range including a pixel whose gray scale value is a value closest to white among the plurality of pixels.

5. The sewing machine according to claim 1, wherein
the setting includes setting, as the specified range, the same range regardless of the relative position.

6. A non-transitory computer-readable medium storing computer-readable instructions that, when executed, instruct a processor of a sewing machine including an image capture portion having a predetermined image capture range and a conveyance portion configured to convey an object to be captured relative to the image capture portion to perform processes comprising:
identifying a target range, the target range being a range wider than the image capture range, and being a range capable of being captured by the image capture portion as a result of the object to be captured being conveyed by the conveyance portion;
calculating a minimum number of times of conveyance in a first direction, when image capture of the whole of the target range is performed such that, while the conveyance portion is conveying the object to be captured in the first direction relative to the image capture portion, image capture of a part of the target range by the image capture portion is repeated by changing a relative position of the object to be captured with respect to the image capture portion in a second direction orthogonal to the first direction;
setting a specified range and the relative position corresponding to the specified range, on the basis of color information of reference image data representing a reference image, which is formed by a plurality of pixels and which is generated by the image capture portion capturing an image of a color reference member, the specified range being a range within the image capture range and being set such that the image capture of the whole of the target range is possible with the calculated minimum number of times of conveyance;
controlling the image capture portion and the conveyance portion so as to cause the image capture portion to capture an image of the object to be captured while conveying the object to be captured in the first direction relative to the image capture portion at the set relative position, and performing processing, the minimum number of times of conveyance, that generates a plurality of image data representing partial images captured in the specified range of the image capture portion; and
synthesizing the plurality of generated partial image data to generate composite image data representing the whole of the target range.

7. The non-transitory computer-readable medium according to claim 6, wherein
the reference image data represents a gray scale value of each of the plurality of pixels; and
the setting includes determining the specified range using, as the color information, the gray scale value of each of the plurality of pixels represented by the reference image data.

8. The non-transitory computer-readable medium according to claim 7, wherein
the setting includes setting, as the specified range, a range in which a difference between the gray scale values of pixels, of the plurality of pixels, at both ends of the range in the second direction is equal to or less than a predetermined value.

9. The non-transitory computer-readable medium according to claim 7, wherein the setting includes setting, as the specified range, a range including a pixel whose gray scale value is a value closest to white among the plurality of pixels.

10. The non-transitory computer-readable medium according to claim 6, wherein the setting includes setting, as the specified range, the same range regardless of the relative position.

* * * * *